United States Patent [19]

Sangregory et al.

[11] Patent Number: 5,007,859
[45] Date of Patent: Apr. 16, 1991

[54] BATTERY-CONTAINING APPARATUS

[75] Inventors: Jude A. Sangregory, Spencerport; Anthony DiRisio, Rochester, both of N.Y.

[73] Assignee: Eastman Kodak Company, Rochester, N.Y.

[21] Appl. No.: 465,670

[22] Filed: Jan. 16, 1990

[51] Int. Cl.⁵ ............................................. H01R 3/00
[52] U.S. Cl. ................................................. 439/500
[58] Field of Search .................. 439/500, 725; 429/96, 429/97, 98, 100, 99

[56] References Cited

U.S. PATENT DOCUMENTS

| | | | |
|---|---|---|---|
| 3,432,967 | 3/1969 | Simon | 49/386 |
| 3,629,793 | 12/1971 | Ruit et al. | 439/500 |
| 3,881,961 | 5/1975 | Nation | 136/173 |
| 3,979,228 | 9/1976 | Marchetti | 429/99 |
| 3,979,288 | 9/1976 | Marchetti | 429/99 |
| 4,129,688 | 12/1978 | Fischer et al. | 429/97 |
| 4,214,830 | 7/1980 | Schröder | 354/202 |
| 4,221,454 | 9/1980 | Wong | 439/500 |
| 4,371,594 | 2/1983 | Ohara et al. | 429/97 |
| 4,468,439 | 8/1984 | Ohara et al. | 429/1 |
| 4,668,070 | 5/1987 | Wakabayashi et al. | 354/484 |
| 4,853,302 | 8/1989 | Yamanaka et al. | 439/500 |

Primary Examiner—Joseph H. McGlynn
Assistant Examiner—Hien D. Vu
Attorney, Agent, or Firm—Roger A. Fields

[57] ABSTRACT

A contact carrier is pivotally coupled to a body portion that defines a chamber for receiving a power source battery, to support a door for pivotal movement with the contact carrier between a closed position covering the chamber and an open position uncovering the chamber. The contact carrier includes an electrically conductive contact for making electrical connection with a corresponding contact of the battery and to bias the battery into the chamber, when the door is closed. The door and the contact carrier are translationally coupled to permit the door to be translated relative to the contact carrier in the closed position to latch the door. Thus, since the contact carrier remains stationary during latching movement of the door, the electrical connection between the two contacts will not be disturbed.

4 Claims, 4 Drawing Sheets

BATTERY-CONTAINING APPARATUS

BACKGROUND OF THE INVENTION

1. Field of the Invention

The invention generally relates to a battery holder and electrical contact for a battery-powered portable apparatus, such as a camera or a tape cassette playback device. More particularly, the invention relates to a battery-containing apparatus wherein a conductive contact makes electrical connection with a power source battery in a chamber and biases the battery into the chamber.

2. Description of the Prior Art

A known battery-containing apparatus comprises a body portion defining a chamber having an opening for inserting at least one battery into the chamber; a door; mounting means supporting the door for pivotal movement relative to the chamber between a closed position for covering the opening and an open position for uncovering the opening and for translational movement relative to the chamber in the closed position between a latched position for securing the door closed and an unlatched position for allowing the door to be opened; and a contact carrier including an electrically conductive contact for making electrical connection with a corresponding contact of the battery.

Typically, the contact carrier is located on an inner face of the door to enable its conductive contact to make electrical connection with the corresponding contact of the battery when the door is closed. If, however, the door must be translated in its closed position to latch the door closed, the electrical connection between the two contacts may be broken or otherwise disturbed. This obviously is a shortcoming in prior art devices.

SUMMARY OF THE INVENTION

According to the invention, there is provided a battery-containing apparatus comprising a body portion defining a chamber having an opening for inserting at least one battery into the chamber, a door, mounting means supporting the door for pivotal movement relative to the chamber between a closed position for covering the opening and an open position for uncovering the opening and for translational movement relative to the chamber in the closed position between a latched position for securing the door closed and an unlatched position for allowing the door to be opened, and a contact carrier including an electrically conductive contact for making electrical connection with a corresponding contact of the battery, characterized in that:

said mounting means includes cooperating means located on the body portion, the door, and the contact carrier for supporting the contact carrier for pivotal movement with the door between the closed and open positions, to electrically connect the conductive contact of the contact carrier and the corresponding contact of the battery when the door is pivoted to its closed position and to disconnect the two contacts when the door is pivoted to its open position, and for supporting the door for translational movement relative to the contact carrier between the latched and unlatched positions, to maintain the two contacts in fixed relation when the door is translated from its unlatched position to its latched position.

Preferably, the cooperating means includes a direct translational connection of the contact contact carrier and the door, to effect translational movement of the door relative to the carrier between its unlatched and latched positions, and a direct pivotal connection of the body portion and the contact carrier, to permit pivotal movement of the carrier relative to the body portion to pivot the door between its closed and open positions. In addition, the conductive contact of the contact carrier is resilient to bias the battery into the chamber when the conductive contact is electrically connected with the corresponding contact of the battery.

Since, the conductive contact of the contact carrier and the corresponding contact of the battery are maintained in fixed relation when the door is translated from its unlatched position to its latched position the electrical connection between the two contacts will not be disturbed and therefore cannot be broken as in prior art devices.

DETAILED DESCRIPTION OF THE PREFERRED EMBODIMENT

Figure 1:
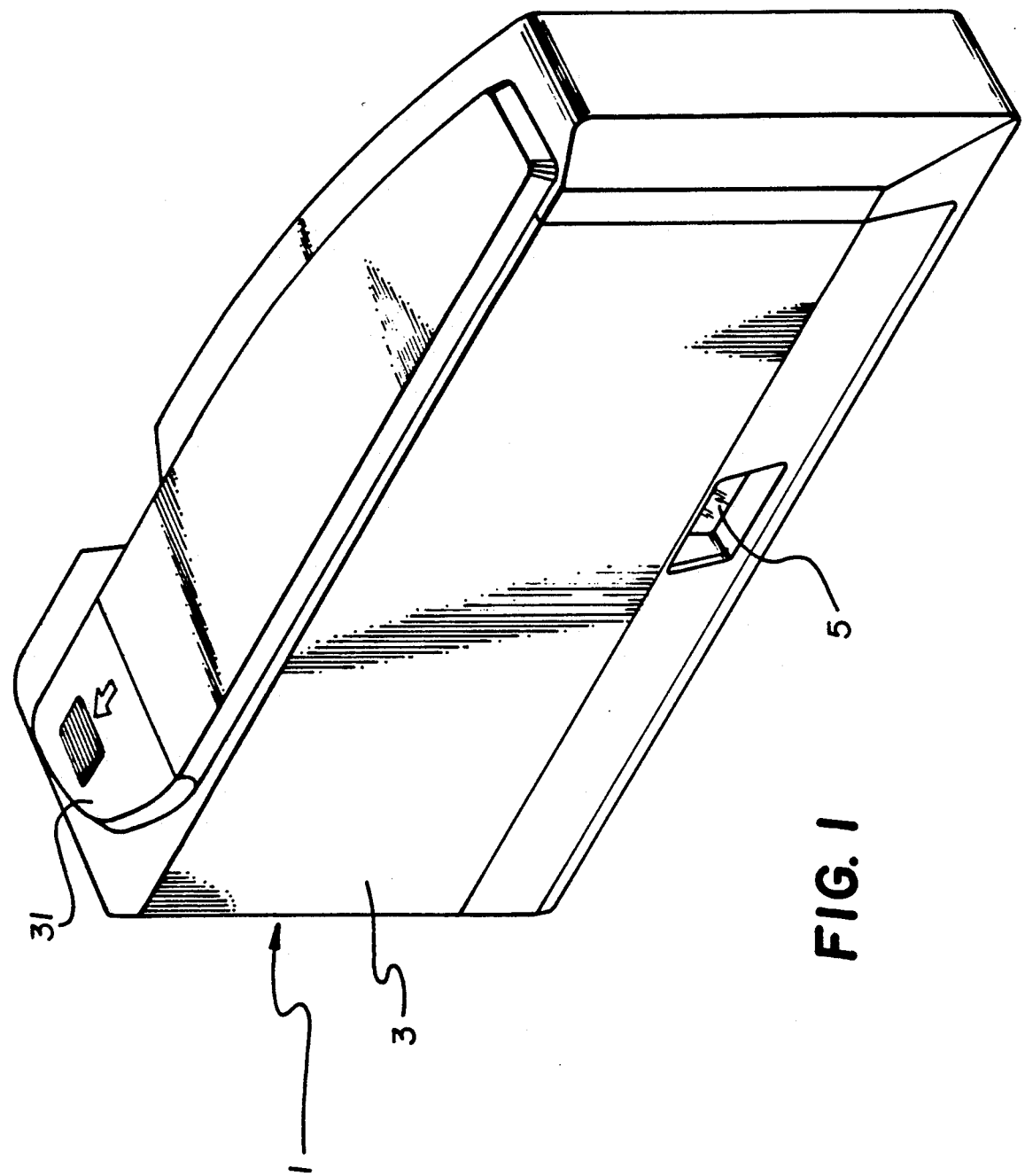
FIG. 1 is bottom-side-up rear perspective view of a still camera including a battery-containing apparatus according to a preferred embodiment of the invention.

Referring now to the drawings, FIG. 1 is a bottom-side-up rear perspective view of a typical 35 mm still camera 1 having a plastic camera body 3 and including a rear viewfinder window 5.

Figure 2:
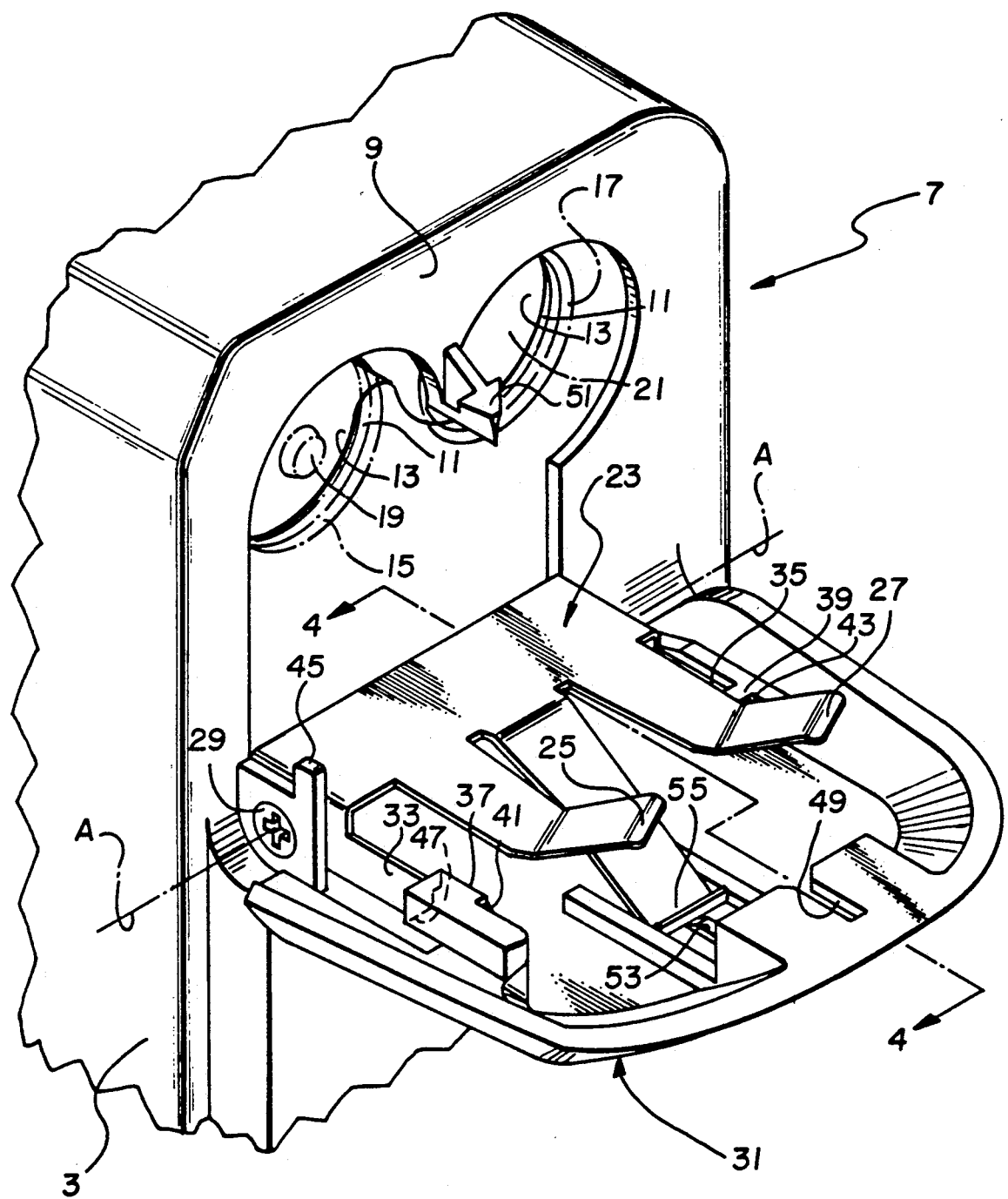
FIG. 2 is a perspective view of the battery-containing apparatus showing a bottom door in an open position to uncover a battery-receiving chamber.

FIG. 2 illustrates a battery-containing apparatus 7 included in the still camera 1. As shown, a body portion 9 of the camera body 3 defines a chamber 11 having an opening 13 for longitudinally receiving two cylindrically shaped standard batteries 15 and 17 having respective contacts 19 and 21.

Figure 3:
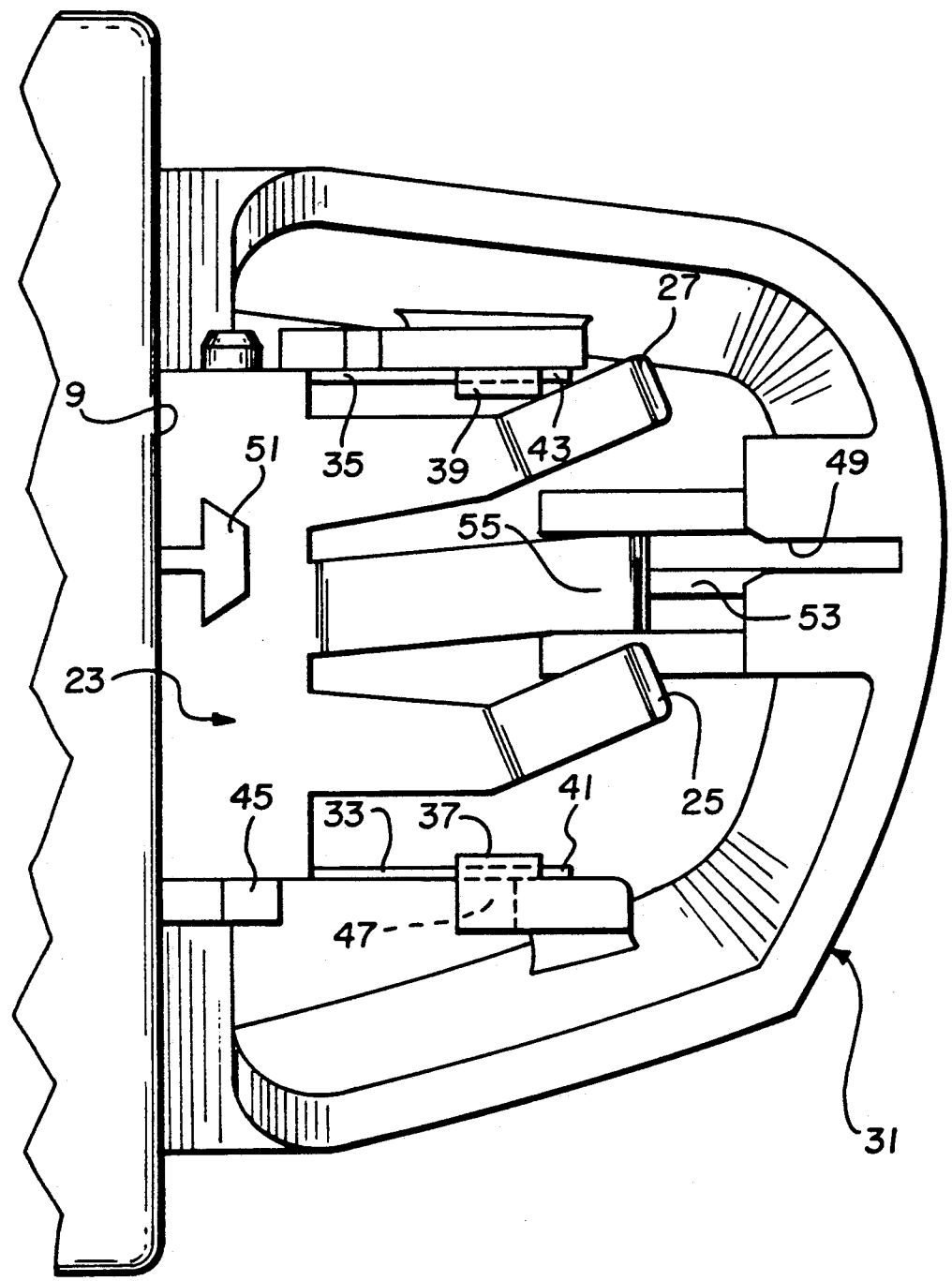
FIG. 3 is plan view of the bottom door in the open position.
Figure 4:
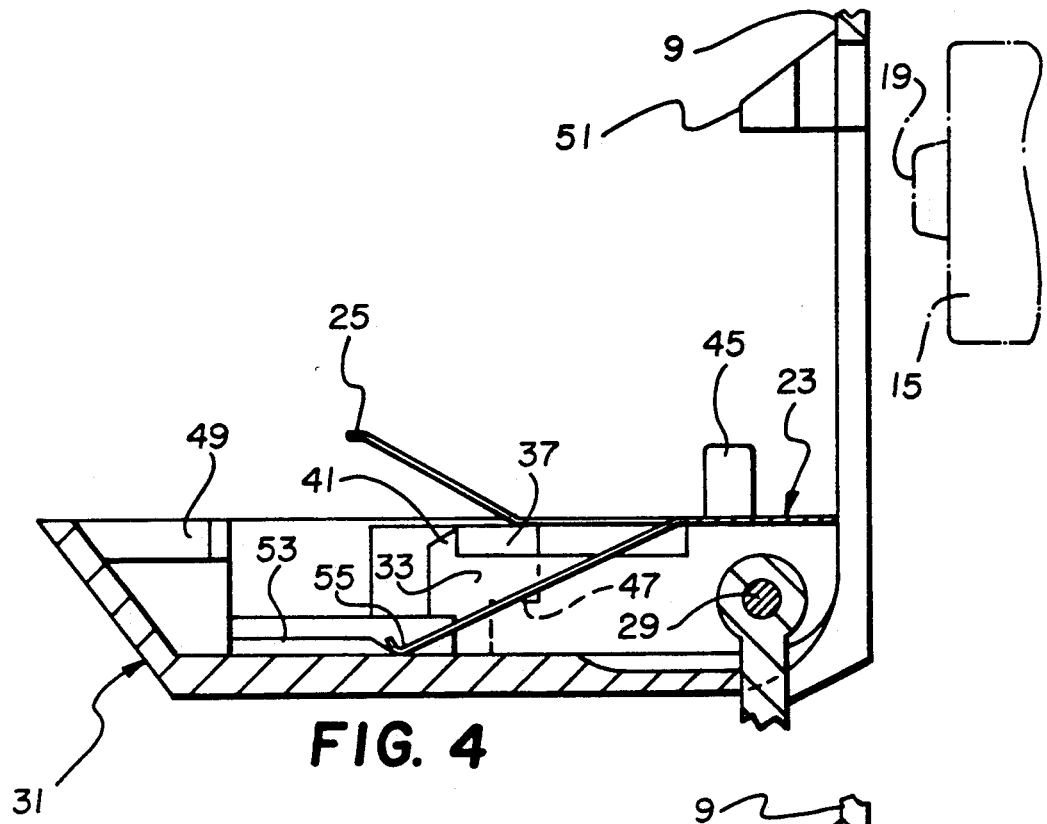
FIG. 4 is a cross-sectional view of the battery-containing apparatus as seen in the direction of the arrows 4,4 in FIG. 2.

A contact carrier 23 is formed of a single piece of sheet metal and includes a pair of spring contact fingers 25 and 27 for making respective electrical connections with the corresponding contacts 19 and 21 of the two batteries 15 and 17 and for resiliently biasing the batteries into the chamber 11. See FIGS. 2 and 5. The contact carrier 23 is pivotally connected to the body portion 9 for swinging movement relative to the body portion about an axis A, by a pair of screw-pins (only one shown) 29 or other known means. A bottom door 31 is slidably or translationally connected to the contact carrier 23 for translational movement relative to the contact carrier in opposite directions perpendicular to the axis A, by a pair of support arms 33 and 35 of the contact carrier which are held to the door by respective retainers 37 and 39 integrally formed with the door. Each of the support arms 33 and 35 has a hooked end 41, 43 to prevent the arms from being moved out of the grasp of the retainers 37 and 39. See FIGS. 3 and 4.

Figure 6:
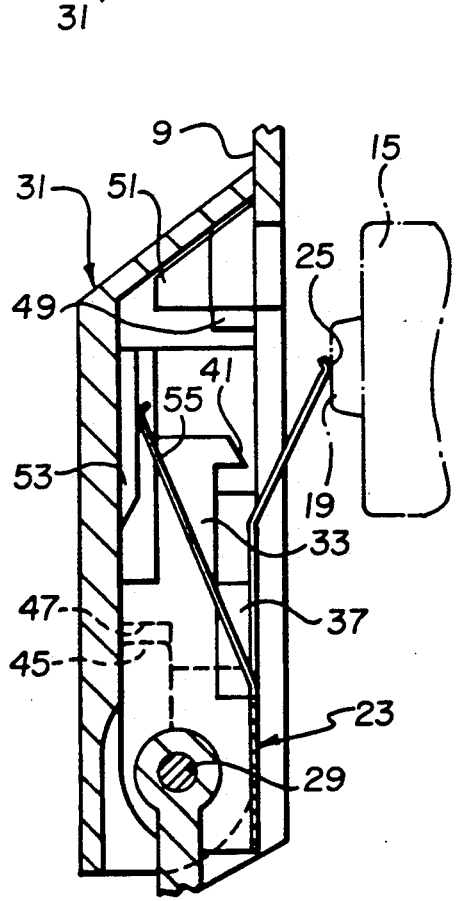
FIG. 6 is a sectional view similar to FIG. 4 showing the bottom door in the closed position and latched.
Figure 5:
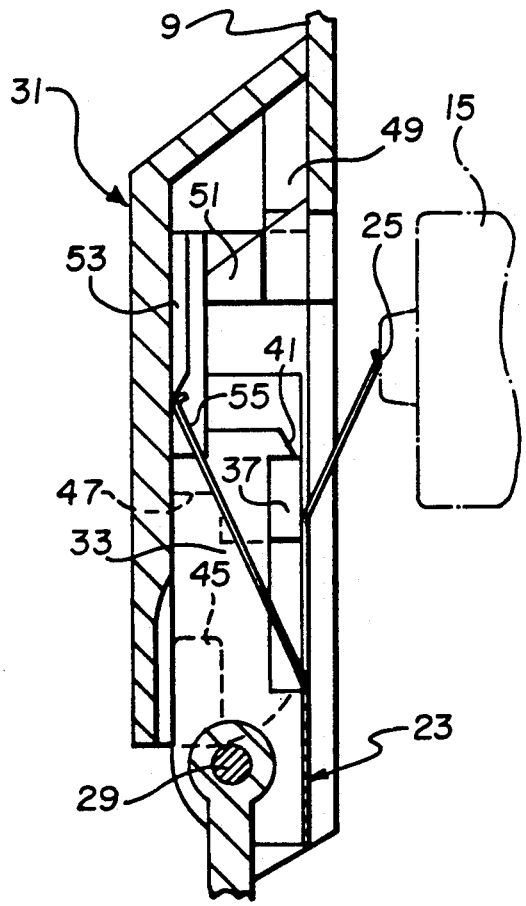
FIG. 5 is a sectional view similar to FIG. 4 showing the bottom door in a closed position, though unlatched.

If, in FIG. 2, the door 31 is pushed in a counter-clockwise direction about the axis A, it will be pivoted with the contact carrier 23 from an illustrated open position to a closed position covering the opening 13 to the chamber 11 as shown in FIG. 5. Concurrently, a lug 45 integrally formed with the body portion 9 will be aligned with a recess or nest 47 in the door 31, and the spring contact fingers 25 and 27 of the contact carrier 23 will be brought to bear against the respective contacts 19 and 21 of the two batteries 15 and 17. See FIG. 5. If, then, the door 31 is translated downwardly in FIG. 5 relative to the contact carrier 23, the lug 45 will enter the recess 47 and a latching slit 49 cut in the door will receive a latching element 51 integrally formed with the body portion 9, to secure the door in a latched position as shown in FIG. 6.

When the door 31 is translated to its latched position (from an unlatched position, shown in FIG. 5), a ramp 53 integrally formed with the door will slip beneath a biasing finger 55 of the contact carrier 23 to slightly bend the resilient finger. As a result, the biasing finger 55 will apply a turning force to the door 31 which serves to maintain the latching element 51 in the latching slit 49.

The invention has been described with reference to a preferred embodiment. However, it will be appreciated that variations and modifications can be effected within the ordinary skill in the art without departing from the scope of the invention.

We claim:

1. A battery-containing apparatus comprising a body portion defining a chamber having an opening for inserting at least one battery into said chamber, a door, mounting means supporting said door for pivotal movement relative to said chamber between a closed position covering said opening and an open position for uncovering the opening and for translational movement relative to the chamber in the closed position between a latched position for securing the door closed and an unlatched position for allowing the door to be opened, and a contact carrier including an electrically conductive contact for making electrical connection with a corresponding contact of the battery, characterized in that:

said mounting means includes cooperating means located on said body portion, said door, and said contact carrier for supporting the contact carrier for pivotal movement with the door between the closed and open positions, to electrically connect said conductive contact of the contact carrier and the corresponding contact of the battery when the door is pivoted to its closed position and to disconnect the two contacts when the door is pivoted to its open position, and furthermore for supporting the door in its closed position for translational movement relative to the contact carrier between the latched and unlatched positions, to maintain the conductive contact of the contact carrier and the corresponding contact of the battery in fixed stationary relation when the door is translated in its closed position from its unlatched position to its latched position.

2. A battery-containing apparatus as recited in claim 1, wherein said cooperating means includes a direct translational connection of said contact carrier and said door, to effect translational movement of the door relative to the contact carrier between its unlatched and latched positions, and a direct pivotal connection of said body portion and the contact carrier, to permit pivotal movement of the contact carrier relative to the body portion to pivot the door between its closed and open positions.

3. A battery-containing apparatus as recited in claims 1 or 2, wherein said conductive contact of the contact carrier is resilient to bias the battery into said chamber when the conductive contact is electrically connected with the corresponding contact of the battery.

4. A battery-containing apparatus as recited in claims 1 or 2, wherein said conductive contact of the contact carrier is integrally formed with the contact carrier of a single piece of sheet metal.

* * * * *